United States Patent
Liebl et al.

(10) Patent No.: US 8,333,553 B2
(45) Date of Patent: Dec. 18, 2012

(54) COMPRESSOR OF A GAS TURBINE

(75) Inventors: Christian Liebl, Bockhorn (DE);
Hans-Georg Lottprein, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 610 days.

(21) Appl. No.: 12/528,436

(22) PCT Filed: Feb. 14, 2008

(86) PCT No.: PCT/DE2008/000277
§ 371 (c)(1),
(2), (4) Date: Aug. 24, 2009

(87) PCT Pub. No.: WO2008/101473
PCT Pub. Date: Aug. 28, 2008

(65) Prior Publication Data
US 2010/0322758 A1    Dec. 23, 2010

(30) Foreign Application Priority Data
Feb. 24, 2007   (DE) .......................... 10 2007 009 134

(51) Int. Cl.
*F04D 29/54* (2006.01)
*F04D 29/64* (2006.01)

(52) U.S. Cl. ........ 415/119; 415/135; 415/139; 415/191; 415/208.2; 415/211.1; 416/190; 416/191; 416/500

(58) Field of Classification Search .................. 415/119, 415/134, 135, 139, 191, 208.1, 208.2, 210.1, 415/211.1; 416/190, 191, 248, 500
See application file for complete search history.

(56) References Cited

U.S. PATENT DOCUMENTS

| | | | | |
|---|---|---|---|---|
| 2,955,799 A | * | 10/1960 | Oickle, Jr. | 416/140 |
| 4,285,633 A | * | 8/1981 | Jones | 415/191 |
| 4,470,754 A | * | 9/1984 | Manente et al. | 415/136 |
| 4,721,434 A | * | 1/1988 | Marshall et al. | 415/119 |
| 4,986,737 A | * | 1/1991 | Erdmann | 416/190 |

(Continued)

FOREIGN PATENT DOCUMENTS
EP    0 707 150 A    4/1996
(Continued)

OTHER PUBLICATIONS
PCT/DE2008/000277, International Search Report and Written Opinion, Jun. 19, 2008.

*Primary Examiner* — Igor Kershteyn
(74) *Attorney, Agent, or Firm* — Howison & Arnott, L.L.P.

(57) ABSTRACT

The invention relates to a compressor, particularly a high pressure compressor, of a gas turbine, particularly of a gas turbine aircraft engine, having at least one rotating blade ring on the rotor side, and having at least one guide blade ring on the stator side, wherein the, or each, guide blade ring is formed of a plurality of guide blade segments, and wherein each guide blade segment is formed of a plurality of individual blades. According to the invention, adjacent individual blades (11, 12; 12, 13; 13, 14) are permanently connected to each other within each guide blade segment (10) of at least one guide blade ring on opposing surfaces positioned radially outward, whereas the same are not connected to each other on opposing surfaces positioned radially inward.

12 Claims, 1 Drawing Sheet

U.S. PATENT DOCUMENTS

| | | | |
|---|---|---|---|
| 5,215,432 A * | 6/1993 | Pickering et al. | 415/119 |
| 5,248,240 A * | 9/1993 | Correia | 415/209.1 |
| 6,910,854 B2 * | 6/2005 | Joslin | 415/139 |
| 7,101,147 B2 * | 9/2006 | Balsdon | 415/135 |
| 2004/0145251 A1 * | 7/2004 | Clouse et al. | 310/51 |
| 2006/0093471 A1 | 5/2006 | Matheny | |

FOREIGN PATENT DOCUMENTS

| | | |
|---|---|---|
| EP | 1 286 022 A | 2/2003 |
| EP | 1 507 067 A | 2/2005 |

* cited by examiner

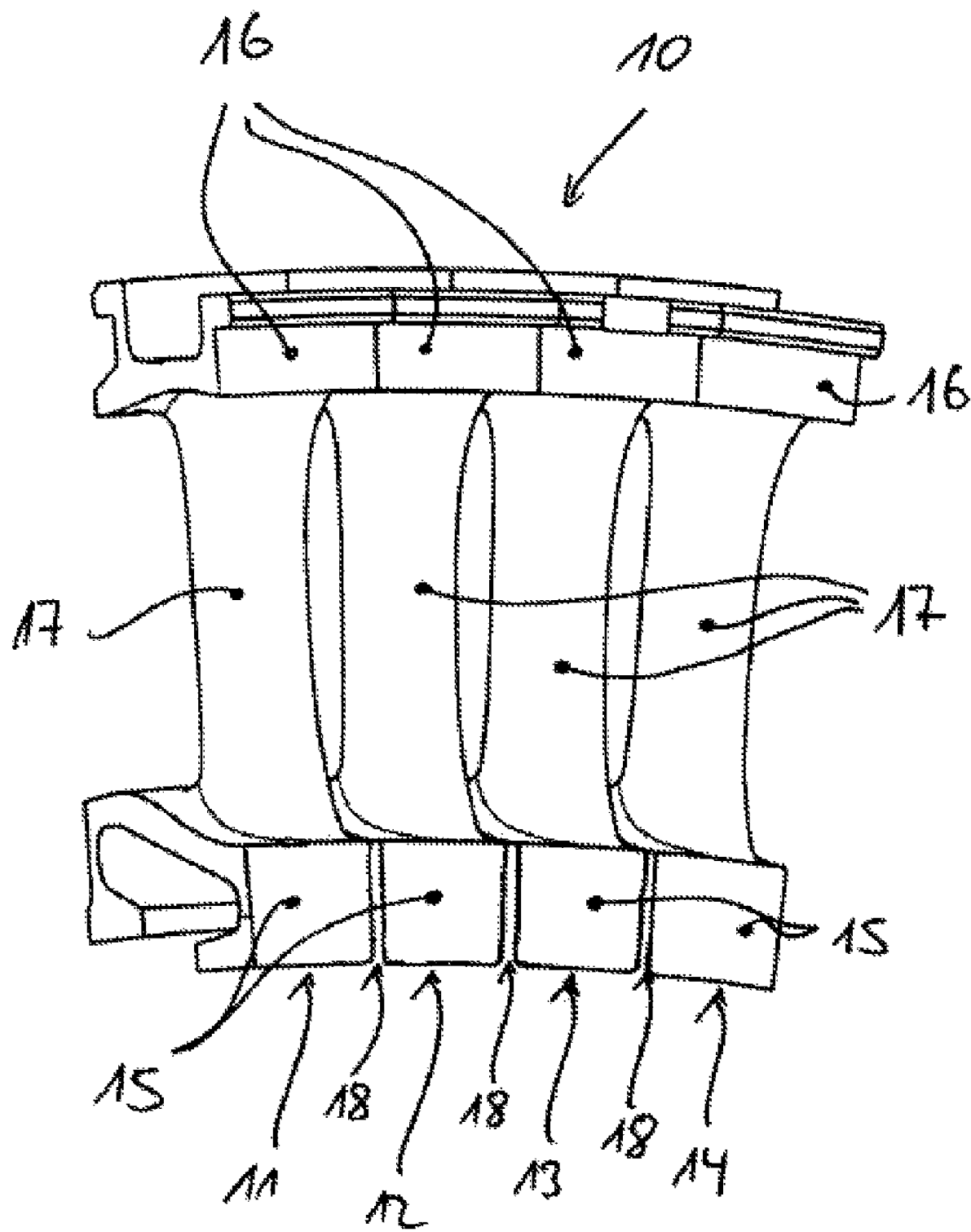

COMPRESSOR OF A GAS TURBINE

CROSS-REFERENCE TO RELATED APPLICATIONS

This application is a U.S. National Phase application submitted under 35 U.S.C. §371 of Patent Cooperation Treaty application serial no. PCT/DE2008/000277, filed Feb. 14, 2008, and entitled COMPRESSOR OF A GAS TURBINE, which application claims priority to German patent application serial no. DE 10 2007 009 134.8, filed Feb. 24, 2007, and entitled VERDICHTER EINER GASTURBINE, the specifications of which are incorporated herein by reference in their entireties.

TECHNICAL FIELD

The invention relates to a compressor, in particular to a high pressure compressor, of a gas turbine, in particular of a gas turbine aircraft engine, in accordance with one aspect.

BACKGROUND

Gas turbine aircraft engines are equipped with at least one compressor, at least one combustion chamber as well as at least one turbine. From the praxis, gas turbine aircraft engines have been known with two compressors, namely one low pressure compressor and one high pressure compressor, as well as two turbines, namely one high pressure turbine and one low pressure turbine.

Moreover, gas turbine aircraft engines have been known with three compressors, namely one low pressure compressor, one intermediate pressure compressor and one high pressure compressor, as well as three turbines, namely one high pressure turbine, one intermediate pressure turbine and one low pressure turbine.

A compressor of a gas turbine aircraft engine, for example the high pressure compressor, has several stages, with each stage being formed by a rotor-side blade ring and a stator-side guide vane ring. The stator-side guide vane rings are formed by several guide vane segments, with each guide vane segment being composed of several individual blades.

In the case of compressors known from the praxis, all individual blades of a guide vane segment are permanently connected to each other radially on the outside as well as radially on the inside through soldering so that the respective guide vane has an overall rigid design. In the praxis it has shown that vibration tears can form in the guide vane segments of such guide vane rings.

SUMMARY

Starting from this, the invention at hand is based on the problem of creating a novel compressor of a gas turbine.

This problem is solved by a compressor as described and claimed herein.

In accordance with the invention, within each guide vane segment of at least one guide vane ring, adjacent individual blades are permanently attached to each other at opposite surfaces located radially on the exterior while not being connected to each other at opposite surfaces located radially on the interior.

In accordance with the invention at hand, it is suggested to permanently connect the adjacent individual blades of each guide vane segment exclusively at opposite surfaces located radially on the exterior within the area of at least one guide vane ring of a compressor of a gas turbine aircraft engine but to leave them unconnected at opposite surfaces located radially on the interior. By way of this, each guide vane segment will retain a certain flexibility, thereby minimizing the danger of vibration tears forming in the guide vane segments. The life of the guide vane segments can be extended thereby. This will ultimately lead to cost reductions.

BRIEF DESCRIPTION OF THE DRAWINGS

Preferred continued developments of the invention will result from the subclaims and from the subsequent description. Embodiments will be explained in detail by way of the drawings without being limited thereto.

FIG. 1 illustrates a guide vane segment of a guide vane ring of a compressor in accordance with the invention.

DETAILED DESCRIPTION

FIG. 1 shows a guide vane segment 10 of a compressor in accordance with the invention, with the guide vane segment 10 preferably being utilized in a high pressure compressor, to wit in rear stages of the same, of a gas turbine aircraft engine. In the embodiment of FIG. 1 as shown, the guide vane segment 10 comprises a total of four individual blades 11, 12, 13 and 14, with each of the individual blades 11, 12, 13 and 14 having an interior shrouding band 15 as well as an exterior shrouding band 16. Between the interior shrouding band and the exterior shrouding band 16 of each individual blade 11, 12, 13 and 14, a turbine blade 17 of the same is arranged.

In accordance with the invention, within the guide vane segment 10, the adjacent individual blades 11, 12, 13 and 14 are permanently attached to each other at opposite surfaces located radially on the exterior while not being connected to each other at opposite surfaces located radially on the interior. The adjacent individual blades 11 and 12, 12 and 13 as well as 13 and 14 are thus permanently connected to each other in the area of the exterior shrouding band 16 at opposite surfaces, but in the area of the interior shrouding band 15 they are unconnected at the surfaces located opposite each other. The connection of the individual blades 11, 12, 13 and 14 in the area of the exterior shrouding band 16 of the same preferably occurs through soldering.

As can be seen from FIG. 1, gaps 18 are formed in the area of the interior shrouding band 15 between opposite surfaces of the adjacent individual blades 11 and 12, 12 and 13 as well as 13 and 14. The gaps 18 preferably have a width of between 0.02 mm and 0.05 mm.

Due to the fact that within the guide vane segment 10 the individual blades 11, 12, 13 and 14 are unconnected in the area of the interior shrouding band 15, the guide vane segment 10 retains a certain flexibility, thereby minimizing the danger of vibration tears forming within the guide vane segment 10.

The invention claimed is:

1. A compressor of a gas turbine, the compressor comprising:
    at least one rotor-side blade ring; and
    at least one stator-side guide vane ring, the guide vane ring being formed by several guide vane segments, each guide vane segment being formed by several individual blades;
        each individual blade including an exterior shrouding band portion located radially on the exterior end of the individual blade, an interior shrouding band portion located radially on the interior end of the individual blade and a turbine blade arranged between the interior shrouding band portion and the exterior shrouding band portion;

wherein within each guide vane segment of the at least one guide vane ring, adjacent individual blades are permanently connected with each other at opposite surfaces of their respective exterior band portions located radially on the exterior while being unconnected with each other at opposite surfaces of their respective interior band portions located radially on the interior.

2. A compressor in accordance with claim 1, wherein gaps are formed within the area of the interior shrouding band between the opposite surfaces of the respective interior band portions of the adjacent individual blades.

3. A compressor in accordance with claim 2, wherein the gaps have a width within the range of 0.02 mm to 0.05 mm.

4. A compressor of a gas turbine aircraft engine having at least one compressor disposed at the forward end, at least one turbine disposed at the rear end and at least one combustion chamber disposed therebetween, the compressor comprising:
at least one rotating blade ring; and
at least one stationary guide vane ring, the guide vane ring including a plurality of guide vane segments, and each guide vane segment including a plurality of individual blades;
each of the individual blades having a radially exterior end with an exterior shrouding band portion formed thereon, a radially interior end with an interior shrouding band portion formed thereon and a turbine blade portion extending therebetween;
wherein adjacent individual blades within each guide vane segment are permanently joined directly to one another at opposing surfaces of the respective exterior shrouding band portions located at their radially exterior ends while being not directly connected to one another at the opposing surfaces of the interior shrouding band portions of their radially interior ends.

5. A compressor in accordance with claim 4, wherein the opposing surfaces of the exterior shrouding band portions of the blades within the guide vane segment are permanently joined directly to one another by soldering.

6. A compressor in accordance with claim 5, wherein the opposing surfaces of the adjacent interior shrouding band portions within the guide vane segment are separated from one another by gaps.

7. A compressor in accordance with claim 6, wherein the gaps between adjacent interior shrouding band portions have a width of between 0.02 mm and 0.05 mm.

8. A compressor in accordance with claim 7, wherein each guide vane segment comprises a total of four individual blades.

9. A compressor in accordance with claim 4, wherein:
the compressor includes at least two stages, each stage including at least one blade ring and at least one guide vane ring and wherein the blade ring and guide vane ring of a first of the at least two stages is configured as a lower pressure stage and the blade ring and guide vane ring of a second of the at least two stages is configured as a higher pressure stage; and
at least one guide vane ring in the higher pressure stage of the at least two stages includes the plurality of guide vane segments having each guide vane segment with the plurality of individual blades wherein adjacent individual blades within each guide vane segment are permanently joined directly to one another at opposing surfaces located at their radially exterior ends while being not directly connected to one another at their radially interior ends.

10. A high-pressure compressor of a gas turbine aircraft engine having a multi-stage compressor disposed at the forward end, a multi-stage turbine disposed at the rear end and at least one combustion chamber disposed therebetween, the high pressure compressor comprising:
at least one rotating blade ring; and
at least one stationary guide vane ring, the guide vane ring including a plurality of guide vane segments, and each guide vane segment including a plurality of individual blades;
each of the individual blades having a radially exterior end with an exterior shrouding band portion formed thereon, a radially interior end with an interior shrouding band portion formed thereon and a turbine blade portion extending therebetween;
wherein opposing surfaces of the exterior shrouding band portions of adjacent individual blades within each guide vane segment are permanently connected directly to one another while opposing surfaces of the interior shrouding band portions are not directly connected to one another.

11. A high-pressure compressor in accordance with claim 10, wherein each guide vane segment comprises a total of four individual blades.

12. A high-pressure compressor in accordance with claim 10, wherein the opposing surfaces of the exterior shrouding band portions within the guide vane segment are permanently connected directly to one another by soldering.

* * * * *